No. 819,434. PATENTED MAY 1, 1906.
E. A. JOHNSTON.
WHEEL FASTENER.
APPLICATION FILED JULY 29, 1905.
*Fig. 1*
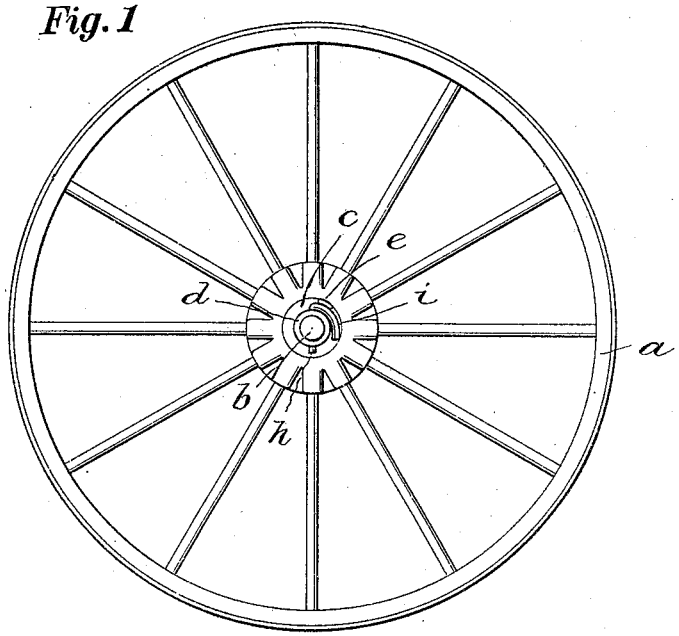
*Fig. 2*
*Fig. 5*
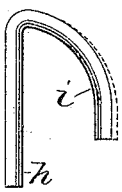
*Fig. 3*
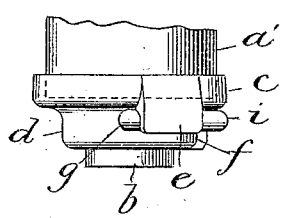
*Fig. 4*
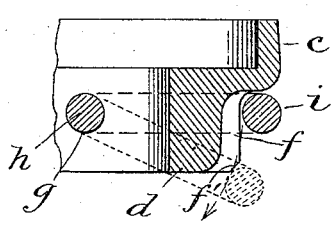
WITNESSES:
J. E. Hutchinson Jr.
R. L. Crust.
INVENTOR
Edward A. Johnston,
BY
Pennie & Goldsborough
ATTORNEYS.

UNITED STATES PATENT OFFICE.

EDWARD A. JOHNSTON, OF STERLING, ILLINOIS.

WHEEL-FASTENER.

No. 819,434.　　　　Specification of Letters Patent.　　　　Patented May 1, 1906.

Application filed July 29, 1905. Serial No. 271,821.

*To all whom it may concern:*

Be it known that I, EDWARD A. JOHNSTON, a citizen of the United States, residing at Sterling, county of Whiteside, State of Illinois, have invented certain new and useful Improvements in Wheel-Fasteners; and I do hereby declare the following to be a full, clear, and exact description of the invention, such as will enable others skilled in the art to which it appertains to make and use the same.

My invention relates to wheel-fasteners, and has for its object to provide a simple, inexpensive, and thoroughly efficient device adapted to be applied to the end of the axle and to secure the wheel upon the axle and which may also serve as a guard for excluding dust, sand, and the like from the interior of the hub, said fastener involving locking means to prevent the accidental displacement of the fastener.

In the accompanying drawings, Figure 1 shows in side elevation a wheel having the invention applied thereto. Fig. 2 is a corresponding view, enlarged, of the wheel-fastener secured to the axle. Fig. 3 is a plan view thereof. Fig. 4 is a longitudinal section of a portion of the fastening device, illustrating the mode of applying the same. Fig. 5 is a detail view of the fastener-pin.

The invention is particularly adapted to harvesting and general agricultural machinery and vehicles which employ metal wheels, although of course it is to be understood that the wheel-fastener is by no means limited to such uses, but is susceptible of a more general application and may, in fact, be employed in connection with any of the well-known types of wheels.

Referring to the drawings, $a$ indicates a wheel, such as usually employed upon agricultural machinery and the like, and is provided with the usual hub-band $a'$. It has been customary heretofore to secure the wheels to the axles by means of cotter-pins, threaded nuts, and the like, so as to enable the wheels to be removed with more or less facility. While devices of this character subserve their own particular functions, they are all liable to work loose and be lost, thereby permitting the wheels to come off of the axles. Furthermore, in applying the old well-known wheel-fastening devices, such as those just mentioned, no provision is made for protecting the coöperating bearing-surface of the hub and axle from the entrance of dust, sand, and the like. In the present invention there is embodied in one device a wheel-fastener and efficient dust-guard, which excludes all foreign matter from the interior of the hub and which comprises a washer fitting over the end of the axle and coöperating with a suitably-formed locking-pin, which passes through the washer and the axle to lock the washer, as well as the wheel, in position upon the axle, said pin in turn engaging and coöperating with suitable lugs on the washer, which prevent the accidental displacement and loss of the pin.

The dust-guard, also constituting an element of the wheel-fastening device, consists of an annular cap $c$, which fits over the edge of the hub-band $a'$, and is formed as an integral part of the body portion $d$ of the washer which slips over the end of the axle $b$, as clearly illustrated in Figs. 2 and 3. The axle $b$ and the body portion $d$ of the washer are provided with registering holes $g$, adapted to receive the straight shank $h$ of a fastening-pin, which is provided with a laterally-displaced spring portion $i$, as shown in Fig. 5.

The annular washer is provided with two lugs $e$ and $f$, which are concentrically arranged thereon and are preferably located upon different radii. The lug $e$, which is formed on the outer periphery of the portion $c$ of the washer, overhangs the central portion $d$ of the latter. The lug $f$ constitutes a simple radial projection from the surface of the portion $d$ and has its outer corner beveled or chamfered to constitute a cam-like surface, which engages with the lower end of the spring member $i$ of the fastening-pin to force said member $i$ outward and cause the upper portion thereof to firmly engage under the projecting lip of the lug $e$.

In applying the device, as hereinbefore described, the wheel is first placed in position upon the axle. The washer is then slipped over the end of the axle until the flange $c$ covers the end of the hub-band $a'$ and the holes $g$ in the cap and the axle are brought into registry. The straight portion $h$ of the locking-pin is then dropped through the holes in the washer and axle, and said pin is revolved until the spring member $i$ thereon engages the cam-like surface $f'$ on the outer edge of the lug $f$, which forces said spring member $i$ outward until it rides up over the surface of said lug $f$ and lodges under the overhanging lip of the lug $e$, so that said spring member is maintained under tension securely locked between the concentric lugs *e* and *f* and can only be released therefrom by revolving the pin backward until it disengages both lugs, which operation requires considerable force, owing to the spring frictional engagement of the member *i* with said lugs.

While the invention has been described with reference to the dust-guard in connection with the wheel-fastener, it is to be understood that the dust-guard feature is entirely subsidiary to the fastening device and may, indeed, be dispensed with without affecting the efficiency of the fastener. For example, the washer may be formed without the hub-rim-enveloping cap *c*, and the lugs *e* and *f* may be located on the body of the washer in appropriate relation to lock the fastening-pin.

Having thus described my invention, what I claim, and desire to secure by Letters Patent, is—

1. A wheel-fastening device, comprising a washer slipped over the end of the axle, a pin passing diametrically through registering holes in the washer and axle, said pin having a laterally-extending spring member, and a locking overhanging lug on the washer beneath which said spring member is turned to lock the pin in position.

2. A wheel-fastening device, comprising a washer to engage the end of the axle, a pin adapted to pass through registering holes in the washer and axle, said pin having a laterally-curved spring member, and concentrically-arranged lugs located on different radii on said washer to engage opposite sides of said spring member to lock the pin in position.

3. A combined dust-guard and wheel-fastener, comprising a cap to engage the end of the axle and cover the edge of the hub, a pin adapted to pass through registering holes in the cap and axle, said pin having a laterally-extending spring member, and a locking overhanging lug on said cap with which said spring member is engaged by rotating the pin after it is in position.

4. A combined dust-guard and wheel-fastener, comprising a cap to engage the end of the axle and cover the edge of the hub, a pin adapted to pass through registering holes in the cap and axle, said pin having a lateral curved spring member, and concentrically-arranged lugs located on different radii on said cap to engage opposite sides of said spring member to lock the pin in position.

5. In a fastening device designed to hold two members in engagement, the combination of a washer encircling a relatively stationary member and contacting with a relatively movable member, a pin adapted to pass through the stationary member in a manner to secure said washer in place, said pin having a spring member, and an overhanging lug on the washer to engage said spring member to lock the pin in position.

6. In a wheel-fastening device, in combination, a sleeve-like washer slipped over the end of the axle, a pin passing through the axle and sleeve and securing said washer in place, said pin having a laterally-extending spring member, and an overhanging lug on said washer engaging said spring member and locking the pin in position.

7. In a wheel-fastening device in combination, a washer to engage the end of the axle, a pin adapted to pass through the axle in a manner to secure said washer in place, said pin having a laterally-curved spring member, and lugs on said washer arranged to engage opposite sides of said spring member to lock the pin in position.

8. In a wheel-fastening device, in combination, a washer to engage the end of the axle, a pin adapted to pass through the axle in a manner to secure said washer in place, said pin having a laterally-curved spring member, and lugs on said washer located on different radii to engage opposite sides of said spring member to lock the spring in position.

In testimony whereof I affix my signature in presence of two witnesses.

EDWARD A. JOHNSTON.

Witnesses:
F. B. CRERICHS,
E. R. THOMPSON.